United States Patent [19]

von Bonin et al.

[11] 3,993,606

[45] Nov. 23, 1976

[54] PROCESS FOR THE PRODUCTION OF POLYURETHANE FOAMS

[75] Inventors: Wulf von Bonin; Helmut Kleimann; Armand de Montigny; Jozsef Ivanyi, all of Leverkusen, Germany

[73] Assignee: Bayer Aktiengesellschaft, Leverkusen, Germany

[22] Filed: Nov. 6, 1974

[21] Appl. No.: 521,424

[30] Foreign Application Priority Data
June 6, 1974 Germany.............................. 2427273

[52] U.S. Cl...................... 260/2.5 AH; 260/2.5 AZ; 260/2.5 AC; 264/300
[51] Int. Cl.² .................. C08G 18/14; C08G 18/32; C08G 5/54
[58] Field of Search ................ 260/2.5 AH, 2.5 AC, 260/2.5 AZ; 264/300

[56] References Cited
UNITED STATES PATENTS

| | | | |
|---|---|---|---|
| 3,620,984 | 11/1971 | Dahm............................. | 260/2.5 AC |
| 3,726,952 | 4/1973 | Boden ........................... | 260/2.5 AZ |

FOREIGN PATENTS OR APPLICATIONS

| | | | |
|---|---|---|---|
| 2,121,670 | 11/1972 | Germany | |
| 879,169 | 10/1961 | United Kingdom ......... | 260/77.5 AC |

Primary Examiner—C. Warren Ivy
Attorney, Agent, or Firm—Joseph C. Gil; Gene Harsh

[57] ABSTRACT

The mold release properties of a molded polyurethane foam are improved by including in the foamable reaction mixture to be molded a salt of a polysiloxane which contains amino groups and a fatty acid.

3 Claims, No Drawings

PROCESS FOR THE PRODUCTION OF POLYURETHANE FOAMS

This process relates to the production of foams which can easily be removed from a mold. Foams based on polyisocyanates, e.g. polyurethane foams which have a dense outer skin and cellular core of the kind obtained by the method of foaming in the mold (German Auslegeschrift No. 1,196,864 and French Patent Specification No. 1,559,325) are eminently suitable for the series production of light-weight constructions, e.g. for building or the manufacture of furniture and vehicles.

The molded polyurethane articles are produced by pouring the foamable reaction mixture which consists of polyisocyanates, compounds which contain at least two hydrogen atoms capable of reacting with isocyanates and additives into closed molds which can be tempered in which it foams up and solidifies in a highly compressed state. The material completely fills the mold and accurately reproduces its internal surface.

The molds are preferably made of a material having a very high thermal capacity and high thermal conductivity, preferably metal, for example aluminum.

To prevent the foam from sticking to the surface of the mold on its removal, the mold is covered with a mold-release agent which may be for example a wax, soap or oil. These mold-release agents form a thin film between the surface of the mold and the molded part, which does not adhere to the mold or to the molded product and therefore facilitates removal of the product from the mold.

This method has various disadvantages for series production. The mold-release agent must be applied at regular intervals and during this time the mold is unavailable for production. Fine engravings on the mold surface, e.g. a simulated wood structure or leather grain, become covered with residues of the mold-release agent in the course of time. It is very difficult and laborious to remove these firmly adhering residues especially as the molds are frequently highly contoured. In addition, the molded parts become coated with a thin film of mold-release agent so that lacquer systems will not adhere to them and they must therefore be rubbed down or cleaned with a solvent before they are lacquered so that the lacquer will adhere sufficiently firmly to the surface.

It has already been disclosed in German Offenlegungsschrift No. 1,953,637 that the application of a mold-release agent to the mold can be omitted if certain additives are added to the foamable reaction mixture. These additives impart excellent mold-release properties to the molded resin so that it can be released from metal molds leaving the surfaces intact. Salts containing at least 25 carbon atoms of aliphatic carboxylic acids and amines, preferably primary amines or amines which contain amide or ester groups, have been recognized as such additives.

German Offenlegungsschrift No. 2,121,670 discloses a process for producing foams by foaming a reaction mixture of polyisocyanates, compounds which contain reactive hydrogen atoms, water and/or organic blowing agents and additives in a closed mold, according to which the additives used consist e.g. of a mixture of (a) salts containing at least 20 aliphatic carbon atoms of aliphatic carboxylic acids and amines which optionally contain amide and/or ester groups and (b) natural and/or synthetic oils, fats or waxes.

Since these additives have an internal lubricating effect on the synthetic resin mixture, they have the added effect of imparting excellent flow properties to the resin composition inside the mold and of reducing the formation of bubbles on the surface of the resin composition. In addition, these internal mold-release agents have an antistatic effect and enable the molded products to be very easily removed even from metal molds having a highly structured surface.

Although excellent mold-release effects can be obtained in hard synthetic resins by known processes, it is frequently found in practice that the esters of higher fatty acids or their mixed esters used as synthetic oils or waxes still do not have sufficient mold-release properties when applied to certain spacial synthetic resins, e.g. elastomeric foam resins.

The problem therefore arose of finding internal mold release agents which would have excellent mold-release properties for the production of polyurethane foams which have a cellular core and dense external skin and which have a particularly elastomeric character.

It is therefore an object of this invention to provide a process for moldig foam plastics which is devoid of the foregoing disadvantages. Another object of the invention is to provide an improved process for molding polyurethane foams. Still another object of the invention is to provide an improved release agent for use in molding polyurethane foams. A further object of the invention is to provide an improved process for molding polyurethane foams having a dense skin and a cellular core. A still further object of this invention is to provide a foamable liquid composition adapted to react, expand and solidify in a mold to substantially fill the mold with a solid polyurethane foam which can be removed from the mold without undesirable sticking of the molded foam to the wall of the mold.

The foregoing objects and others are accomplished in accordance with this invention, generally speaking, by providing a foamable reaction mixture adapted to be molded and containing an organic polyisocyanate and as an internal mold release agent, a salt of a polysiloxane which contains amino groups and a fatty acid. The invention also provides a process for molding the reaction mixture wherein the above foamable reaction mixture is charged to a suitable mold free from mold release agent on its inner walls, the mold is closed while the mixture reacts, expands and solidifies in the mold and the resulting molded product is easily removed from the mold.

It has now surprisingly been found that salts of polysiloxanes which contain amino groups and long chain fatty acids, alone or in admixture with other mold-release agents or systems, have an excellent mold-release action in the production of foams by the process of foaming in the mold and impart good mold-release properties to elastomeric foam resins.

This invention therefore relates to a process for producing self-releasing foams in closed molds by foaming a reaction mixture of polyisocyanates, compounds with molecular weights of 62 to 10,000 which contain reactive hydrogen atoms, water and/or organic blowing agents, mold-release agents and optionally other additives, characterized in that the mold-release agents used are salts of polysiloxanes which contain amino groups and fatty acids.

The mold-release action is assessed subjectively by manually opening a suitable mold and removing from it a foamed plate (20 × 20 × 1 cm). The forces required to remove the foams according to the invention which have been treated with the new mold-release agents are considerably smaller than those required for otherwise identical foams which have been produced by foaming a reaction mixture without these additives.

The foam resins of the process according to the invention are primarily polyurethane foams known per se which are foamed up in closed molds. The mold-release agents which are the essential part of the invention, however, can be used equally advantageously for producing other foams based on polyisocyanates by the process of foaming in the mold, that is to say the kind of foams which can be obtained from polyisocyanates alone or with the addition of compounds which contain at least two Zerewitinoff-active hydrogen atoms, e.g. polycarbodiimide, polyisocyanurate, polyurea, polybiuret or polyamide foams, mixed types or other foams based on polyisocyanates.

The mold-release agents according to the invention are also effective if the foams are produced without the aid of blowing agents, i.e. if the process of injection molding reactive mixtures is employed so that the products obtained are not foams in the true sense but are more or less compact moldings.

The isocyanates used as starting materials according to the invention may be aliphatic, cycloaliphatic, araliphatic, aromatic or heterocyclic polyisocyanates of the kind described e.g. by W. Siefgen in Justus Liebigs Annalen der Chemie, 562, pages 75 to 136, for example ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3- and -1,2-diisocyanate and any mixtures of these isomers, 1-isocyanato-3,3,5-trimethyl-5-isocyanatomethylcyclohexane (U.S. Pat. No. 3,401,190), hexahydrotolylene-2,4- and -2,6-diisocyanate and any mixtures of these isomers, hexahydrophenylene-1,3- and/or -1,4-diisocyanate, perhydrodiphenylmethane-2,4'- and/or -4,4'-diisocyanate, phenylene-1,3- and -1,4-diisocyanate, tolylene-2,4- and -2,6-diisocyanate and any mixtures of these isomers, diphenylmethane-2,4'- and/or -4,4'-diisocyanate, naphthylene-1,5-diisocyanate, triphenylmethane-4,4',-4''-triisocyanate, polyphenyl-polymethylene polyisocyanates which can be obtained by aniline-formaldehyde condensation followed by phosgenation and which have been described e.g. in British Pat. Specification Nos. 874,430 and 848,671, perchlorinated aryl polyisocyanates as described e.g. in U.S. Pat. No. 3,277,138, polyisocyanates which contain carbodiimide groups as described in U.S. Pat. No. 3,152,162, the diisocyanates described in U.S. Pat. No. 3,492,330, polyisocyanates which contain allophanate groups as described e.g. in British Pat. Specification No. 994,890, Belgian Pat. Specification No. 761,626 and published Dutch Pat. Application No. 7,102,524, polyisocyanates which contain isocyanurate groups as described e.g. in U.S. Pat. No. 3,001,973, in German Pat. Specification Nos. 1,022,789, 1,222,067 and 1,027,394 and in German Offenlegungsschriften No. 1,929,034 and 2,004,048, polyisocyanates which contain urethane groups as described e.g. in Belgian Pat. Specification 752,261 or in U.S. Pat. No. 3,394,164, polyisocyanates which contain acylated urea groups according to German Pat. Specification No. 1,230,778, polyisocyanates which contain biuret groups as described e.g. in U.S. Pat. Nos. 3,124,605 and 3,201,372; in British Pat. Specification No. 889,050 and in French Pat. Specification No. 7,017,514, polyisocyanates prepared by telomerization reactions as described e.g. in U.S. Pat. No. 3,654,106; polyisocyanates which contain ester groups as described e.g. in British Pat. Specification Nos. 965,474 and 1,072,956, in U.S. Pat. No. 3,567,763 and in German Pat. Specification No. 1,231,688, and reaction products of the above mentioned isocyanates with acetals according to German Pat. Specification No. 1,072,385.

The distillation residues from the commercial production of isocyanates, which still contain isocyanate groups, may also be used, optionally dissolved in one or more of the above mentioned polyisocyanates. Any mixture of the above mentioned polyisocyanates may also be used.

It is generally preferred to use commercial polyisocyanates which are readily available, e.g. tolylene-2,4- and -2,6-diisocyanate and any mixtures of these isomers ("TDI"), polyphenyl-polymethylene polyisocyanates which can be obtained by aniline-formaldehyde condensation followed by phosgenation (crude MDI) and polyisocyanates which contain carbodiimide groups, urethane groups, allophanate groups, isocyanurate groups, urea groups or biuret groups (modified polyisocyanates).

For producing semi-rigid elastic foams which are of particular interest in this invention and which have a density in the region of 200 to 1100 kg/m$^3$, preferably 500 to 900 kg/m$^3$, it is particularly preferred in the process according to the invention to use modified aromatic diisocyanates, in particular derivatives of 4,4'-diphenylmethane diisocyanate.

Examples of these particularly preferred polyisocyanates include 4,4'-diphenylmethane diisocyanate which has been liquified by partial carbodiimidization, for example according to German PS No. 1,568,501 by heating to 225° C for 1–2 hours in the presence of 2.5 mol-% of urea, or the "liquified" 4,4'-diphenylmethane diisocyanate which can be obtained by reacting 1 mol of 4,4'-diphenylmethane-diisocyanate with about 0.1–0.3 mol of a dipropylene or polypropylene glycol which has a molecular weight of not more than 700.

The starting materials used according to the invention also include compounds which contain at least two hydrogen atoms which are reactive with isocyanates, generally with a molecular weight of 62 to 10,000. Apart from compounds which contain amino groups, thiol groups or carboxyl groups, these compounds are preferably polyhydroxyl compounds, in particular compounds with two to eight hydroxyl groups, especially those with a molecular weight of 200 to 10,000, preferably 1000 to 6000, e.g. polyesters, polyether, polythioethers, polyacetals, polycarbonates or polyester amides which contain at least two, generally two to eight but preferably two to four hydroxyl groups, of the kind which are known per se for the production of homogeneous or cellular polyurethanes. In the process according to the invention, the above mentioned higher molecular weight polyhydroxyl compounds are frequently used in admixture with up to 95% by weight, preferably up to 50% by weight, based on the total quantity of polyhydroxyl compounds, of low-molecular weight polyols with molecular weights of 62 to 200. Such low-molecular weight polyols include e.g. ethylene glycol, propane-1,2-diol, propane-1,3-diol, butane-1,2-diol, butane-1,4-diol, hexane-1,6-diol, decane-1,10-diol, diethylene glycol, triethylene glycol, tetraethylene glycol, dipropylene glycol, tripropylene glycol, glycerol, trimethylolpropane and the like.

The polyesters with hydroxyl groups which may be used according to the invention include e.g. reaction products of polyvalent alcohols, preferably divalent with the optional addition of trivalent alcohols, and polybasic, preferably dibasic carboxylic acids. The corresponding polycarboxylic acid anhydrides or polycarboxylic acid esters of lower alcohols or mixtures thereof may be used for producing the polyesters instead of the free polycarboxylic acids. The polycarboxylic acids may be aliphatic, cycloaliphatic, aromatic and/or heterocyclic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally admixed with monomeric fatty acids, dimethyl terephthalate and bis-glycol terephthalate. Suitable polyhydric alcohols include e.g. ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethyl cyclohexane), 2-methylpropane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, e.g. ε-caprolactone or hydroxycarboxylic acids, e.g. ω-hydroxycaproic acid may also be used.

The polyethers with at least two, generally two to eight and preferably two or three hydroxyl groups which may be used according to the invention are also known per se and can be prepared e.g. by the polymerization of epoxides such as ethylene oxide, propylene oxide, butylene oxide, tetrahydrofuran, styrene oxide or epichlorohydrin, with themselves, e.g. in the presence of $BF_3$, or by the addition of these epoxides, optionally as mixtures or successively, to starting components which contain reactive hydrogen atoms such as alcohols or amines, e.g. water, ethylene glycol, propylene-1,3- or -1,2-glycol, trimethylolpropane, 4,4'-dihydroxy diphenylpropane, aniline, ammonia, ethanolamine or ethylene diamine. Sucrose polyethers of the kind described e.g. in German Auslegeschriften Nos. 1,176,358 and 1,064,938 may also be used according to the invention. It is frequently preferred to use polyethers which contain predominantly primary OH-groups (up to 90% by weight, based on all the OH-groups in the polyether). Polyethers which are modified with vinyl polymers, e.g. the products obtained by polymerizing styrene or acrylonitrile in the presence of polyethers (U.S. Pat. Nos. 3,383,351, 3,304,273, 3,523,093 and 3,110,695 and German Pat. Specification No. 1,152,536) are also suitable. Polybutadienes which contain OH-groups may also be used.

Among the polythioethers may be particularly mentioned the condensation products of thiodiglycol with itself and/or with other glycols, dicarboxylic acids, formaldehyde, aminocarboxylic acids or amino alcohols. The products are polythio mixed ethers, polythioether esters or polythioether ester amides, depending on the cocomponents.

The polyacetals used may be the compounds obtained e.g. from glycols such as diethylene glycol, triethylene glycol, 4,4'-dioxethoxy-diphenyl dimethylmethane, hexanediol and formaldehyde. Polyacetals which are suitable for the invention may also be obtained by polymerizing cyclic acetals.

Suitable polycarbonates having hydroxyl groups include those known per se, which can be obtained e.g. by reacting diols such as propane-1,3-diol, butane-1,4-diol, and/or hexane-1,6-diol, diethylene glycol, triethylene glycol or tetraethylene glycol with diaryl carbonates such as diphenyl carbonate or phosgene.

The polyester amides and polyamides include e.g. the predominantly linear condensates obtained from polyvalent saturated and unsaturated carboxylic acids or their anhydrides, and polyvalent saturated and unsaturated amino alcohols, diamines, polyamines and their mixtures.

Polyhydroxyl compounds which already contain urethane or urea groups, modified or unmodified natural polyols such as castor oil, carbohydrates and starches may also be used. Addition products of alkylene oxides with phenol formaldehyde resins or with urea formaldehyde resins may also be used in the process according to the invention.

Examples of these compounds used according to the invention have been described e.g. in High Polymers, Volume 16, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and in Kunststoff-Handbuch Volume VII, Vieweg-Hochtlen, Carl-Hanser-Verlag, Munich 1966, e.g. on pages 45 to 71.

For producing the semi-rigidelastomeric foams having a dense outer skin of this invention which are of particular interest, it is preferred to use difunctional polyhydroxyl compounds of the kind mentioned above which are optionally admixed with up to 10 hydroxyl equivalent percent, based on the total mixture of polyhydroxyl compounds, of higher-functional polyhydroxyl compounds of the said kind, in particular trifunctional polyhydroxyl compounds.

In the process according to the invention, the reactants (including water which may be used as blowing agent) are used in proportions which correspond to an NCO-coefficient of 70 to 160 (an NCO-coefficient of 100 means that the reaction mixture contains equivalent quantities of isocyanate groups and active hydrogen atoms which react with these isocyanate groups). When producing the semi-rigidelastomeric foams having a dense outer skin which are particularly important in the context of this invention, the NCO-ratio is generally between 90 and 110.

According to the invention, water and/or readily volatile organic substances are frequently added as blowing agents. Suitable organic blowing agents are e.g. acetone, ethyl acetate, methanol, ethanol, halogenated alkanes such as methylene chloride, chloroform, ethylidene chloride, vinylidene chloride, monofluorotrichloromethane, chlorodifluoromethane and dichlorodifluoromethane or butane, hexane, heptane or diethyl ether. Compounds which decompose to liberate gases such as nitrogen at temperature above room temperature may also act as blowing agents, for example azo compounds such as azoisobutyric acid nitrile. Other examples of blowing agents and details concerning the use of blowing agents have been described in Kunststoff-Handbuch, Volume VII, published by Vieweg and Hochtlen, Carl-Hanser-Verlag, Munich 1966, e.g. on pages 108 and 109, 453 to 455 and 507 to 510.

Catalysts are frequently used according to the invention. The catalysts may be known per se, e.g. tert. amines such as triethylamine, tributylamine, N-methyl-morpholine, N-ethyl-morpholine, N-cocomorpholine, N,N,N',N'-tetramethyl-ethylene diamine, 1,4-diaza-bicyclo-(2,2,2)-octane, N-methyl-N'-dimethyl-aminoethyl piperazine, N,N-dimethyl benzylamine, bis-(N,N-diethylaminoethyl) adipate, N,N-diethyl benzylamine, pentamethyl diethylene triamine, N-N-dimethyl cyclohexylamine, N,N,N',N'-tetramethyl-1,3-butane diamine, N,N,-dimethyl-β-phenyl ethylamine, 1,2-dimethyl imidazole and 2-methyl imidazole.

Suitable tertiary amines containing hydrogen atoms which are reactive with isocyanate groups include e.g. triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Sila amines with carbon-silicon bonds of the kind described e.g. in German Pat. Specification No. 1,229,290 may also be used as catalyst, e.g. 2,2,4-trimethyl-2-silamorpholine or 1,3-diethylaminomethyl-tetramethyl-disiloxane.

Nitrogen-containing bases such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin (II) salts of carboxylic acids such as tin (II) acetate, tin (II)-octoate, tin (II) ethyl hexoate or tin (II) laurate and the dialkyl tin salts of carboxylic acids such as dibutyl tin diacetate, dibutyl tin dilaurate, dibutyl tin maleate or diocyl tin diacetate.

Other examples of catalysts which may be used according to the invention and details concerning their action have been described in Kunststoff-Handbuch, Volume VII, published by Vieweg and Hochtlen, Carl-Hanser-Verlag, Munich 1966, e.g. on pages 96 to 102.

The catalysts are generally used in a quantity between about 0.001 and 10% by weight, based on the quantity of compounds with a molecular weight of 62 to 10,000 having at least two hydrogen atoms which are reactive with isocyanates.

Surface-active additives (emulsifiers and foam stabilizers) may also be used in the process according to the invention. Suitable emulsifiers are e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecyl benzene sulphonic acid or dinaphthyl methane disulphonic acid or of fatty acids such as ricinoleic acid or of polymeric fatty acids may also be used as surface-active additives.

The foam stabilizers used are mainly water-soluble polyether siloxanes. The structure of these compounds generally consists of a copolymer of ethylene oxide and propylene oxide to which a polydimethyl siloxane group is attached. Foam stabilizers of this kind have been described e.g. in U.S. Pat. Nos. 2,764,565 and 3,629,308.

Other additives which may also be used according to the invention include reaction retarders, e.g. substances which are acid in reaction such as hydrochloric acid or organic acid halides; cell regulators known per se such as paraffins, fatty alcohols or dimethyl polysiloxanes; pigments or dyes, flame-retarding agents known per se such as tris-chloroethyl phosphate or ammonium phosphate and ammonium polyphosphate; stabilizers against aging and weathering; plasticizers; fungistatic and bacteriostatic substances; and fillers such as barium sulphate, kleselguhr, carbon black or whiting.

Other examples of surface-active additives and foam stabilizers, cell regulators, reaction retarders, stabilizers, flame-retarding substances, plasticizers, dyes, fillers and fungicidal and bacteriocidal substances which may be used according to the invention and details concerning methods of using them and their activity have been described in Kunststoff-Handbuch, Volume VI, published by Vieweg and Hochtlen, carl-Hanser-Verlag, Munich 1966, e.g. on pages 103 to 113.

In the process according to the invention, foaming is carried out in molds. The reaction mixture is introduced into a mold. The material used for the mold may be metal, e.g. aluminum. The reaction mixture foams up in the mold to form the molded article. Foaming in the mold may be carried out to produce a product which has a cellular structure on its surface or it can be carried out to produce a product with a compact skin and cellular core. According to the invention, this can be achieved by either introducing sufficient reaction mixture into the mold so that it will just completely fill the mold when it has foamed or by introducing a larger quantity of reaction mixture than is necessary for filling the interior of the mold. The latter method is known as overcharging. A method of this kind has been described e.g. in U.S. Pat. Nos. 3,178,490 and 3,182,104.

Cold setting foams may also be produced according to the invention (see British Pat. Specification No. 1,162,517 and German Offenlegungsschrift No. 2,153,086).

According to the invention, salts of polysiloxanes which contain amino groups and in particular long chain fatty acids with more than 7 carbon atoms are used as mold-release agents.

These mold-release agents which are essential to the invention are used in quantities of 0.1 to 25% by weight, preferably 0.5 to 10% by weight, based on the foamable mixture or the total reaction mixture.

The long chain fatty acids used are preferably those with more than 7 carbon atoms, in particular with 12 to 20 carbon atoms. Although natural or synthetic dicarboxylic and polycarboxylic acids may also be used, it has been found most suitable to use natural or synthetic monocarboxylic acids or natural fatty acid mixtures such as abietic acid, palmitic acid, stearic acid, oleic acid, elaidic acid, linoleic acid, ricinoleic acid and their fatty acid esters, linolenic acid or commercially obtained fatty acid mixtures such as sperm-oil fatty acid, train-oil fatty acid, tallow fatty acid, soya-oil fatty acid, palm kernal fatty acid, ground nut fatty acid, tall-oil fatty acid, etc. Fatty acids or fatty acid mixtures which are liquid at room temperature are preferred, in particular oleic acid and/or commercial fatty acid mixtures consisting mainly of oleic acid, or soya-oil fatty acid, tall-oil fatty acid or esterification products of oleic acid and ricinoleic acid.

The amino group containing polysiloxanes may be linear or branched but linear polysiloxanes are mainly used. They may contain at least three but preferably more than five and up to 90 Si-atoms incorporated in them. Although in principle polysiloxanes with an even higher Si-content could be used, they are less suitable because they are occasionally found to be incompatible with other components in the foaming mixture.

The amino polysiloxanes may contain aromatically and/or aliphatically substituted Si-atoms but aliphatic polysiloxanes are preferred such as methyl polysiloxane.

Those amino polysiloxanes which contain amino groups connected to the silicon atoms through carbon atoms are preferred. The amino groups may be primary, secondary or tertiary but are preferably secondary.

In addition to the substituent which links the amino nitrogen to the silicon atom, and which is preferably a $CH_2$-group, the amino nitrogen may carry aliphatic, aromatic, araliphatic or cyclic hydrocarbon groups with 1 to 18 carbon atoms as substituents, for example phenyl, benzyl, methyl, ethyl, butyl, isooctyl, oleyl or preferably cyclohexyl groups.

The amino polysiloxanes used should contain at least one but preferably several amino groups in the molecule. The amino groups should preferably be end groups in the polysiloxane chain but one or more amino groups may in addition be distributed along the chain, for example statistically. The amino polysiloxanes preferably contain 2 to 5 amino groups in the molecule and have the ends of the chain occupied by amino groups.

Preferred aminopolysiloxanes are those of the formula

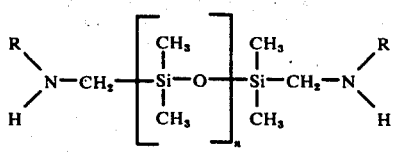

wherein $n$ is an integer of from 4 to 20 and R stands for an aliphatic hydrocarbon radical having 1–4 carbon atoms or a cyclohexyl radical.

Linear amino polysiloxanes containing 5 to 20 Si-atoms and carrying secondary amino cyclohexyl end groups attached to the Si-atom through $CH_2$ groups are the most preferred.

The salts are easily prepared by combining the amino polysiloxanes with the fatty acids, e.g. by stirring together at room temperature. 1 mol of fatty acid is generally used per amino group present in the amino polysiloxane but at least 1 mol of fatty acid is used per mol of amino polysiloxane. The fatty acids could also be used in quantities other than stoichiometric quantities, e.g. 50 to 200 mol-% of fatty acid per mol of amino groups but stoichiometric quantities, based on the amino groups in the polysiloxane, are preferred. The quantity may deviate from this by about ±100 mol-% but at least 1 mol of fatty acid must be present per molecule of amino siloxane. If more than the stoichiometric quantities of fatty acid are used, the resulting component mixture constitutes the mold-release agent for the process.

The mold-release agents used according to the process are generally used in a prefabricated state and either added separately to the foaming mixture or first dissolved or dispersed in one of the reactants (preferably the polyol) which is then added to the remainder of the reaction mixture. However, the mold-release agent may also be produced in situ by introducing the amino polysiloxane and the fatty acid separately into the reaction process which will result in the molded product. These separate components of the mold-release agent may either be added in pure form or distributed or dissolved in the foaming components. The salts used as mold-release agents may, of course, also be produced in one of the reactants, e.g. the polyol.

Some of the mold-release agents according to the invention show little or no tendency to separate from the polyol components of the reaction mixtures.

The preparation of amino polysiloxanes used in the salt form is already known and is normally carried out by processes of the kind described, for example, in U.S. Pat. Nos. 3,658,864 or 3,657,303.

The polysiloxanes having amino groups are produced by reacting polysiloxanes which contain chloromethyl groups with amines such as cyclohexylamine. The polysiloxanes with chloromethyl groups in turn can easily be obtained in known manner by direct cohydrolysis e.g. of mixtures of chloromethyl-dimethyl-chlorosilane and dimethyl-dichloro-silane followed by equilibrating the reaction mixture. The proportion of chloro-methyl-dimethyl-chlorosilane to dimethyldichlorosilane is selected according to the desired molecular weight.

Thus, a polysiloxane having amino groups may be prepared, for example, by introducing a mixture of chloro-methyl-dimethyl-chlorosilane and dimethyl-dichlorosilane into an excess quantity of ice-water. The organic phase is separated after 2 hours, neutralized with potassium bicarbonate, washed with a further quantity of water and dried over sodium sulphate. For equilibration, the siloxane phase is mixed with about 3% by weight of acid fullers earth and heated to 150° C for 5 hours. The mixture is then filtered to obtain the equilibrated polysiloxane which contains chloromethyl groups. The chloromethyl polysiloxane is then slowly introduced dropwise at 100° C into an approximately 10-times molar quantity of cyclohexylamine, based on the quantity of chloromethyl groups. The reaction mixture is then stirred for another 2 hours at 100° C. It is then left to cool and filtered from the salt at 20° C. The excess cyclohexylamine is then distilled off under vacuum leaving the desired polysiloxane having amino end groups.

If desired, chloromethyl-methyl-dichlorosilane and optionally trimethyl-chlorosilane may be added in the process of cohydrolysis to add amino groups to the siloxane chain or to obtain compounds which contain only side chain amino groups (complete replacement of chloromethyl-dimethyl-chlorosilane by trimethyl chlorosilane and at the same time addition of chloro methyl-methyl-dichlorosilane).

The mold-release agents used according to the invention can, in principle, improve the mold release of an polyurethanes which are foamed up inside the mold i.e. both soft and semi-rigid foams as well as hard foam known per se but they are particularly suitable fo producing hard, semi-rigid and soft polyurethane foams having a compact outer skin which are known per se.

The formulations for producing the foams may, of course, also include other mold-release agents or systems, for example those described in German Offenlegungsschriften No. 1,953,637 and No. 2,121,670 or in Belgian Pat. Specification No. 782,942, e.g. the oleic acid or tall-oil fatty acid salt of amide group-containing amines which can be obtained by reacting N-dimethylaminopropylamine with oleic acid or tall-oil fatty acid.

The mold-release agents of the kind described in German Patent Applications P 23 06 276.2 and P 23 56 692.9 which are introduced into the foam by way of modified isocyanates may be used in addition.

According to the invention, the starting materials are reacted together by the known one-step process, prepolymer process of semi-prepolymer process, often with the aid of mechanical devices of the kind described e.g. in U.S. Pat. No. 2,764,565. Details concerning the apparatus which is suitable for the process according to the invention may be found in Kunststoff-Handbuch, Volume VI, published by Vieweg and Hochtlen, Carl-Hanser-Verlag, Munich 1966, e.g. on pages 121 to 205.

Hard products produced by the process may be used for the manufacture of furniture parts, parts of bodies of motor vehicles, technical apparatus and structural elements while semi-rigid to soft products may be used for the manufacture of safety padding in the construction of motor vehicles, elastic shoe soles, shock-absorbers, etc.

The process according to the invention is described below with the aid of examples. The parts given are parts by weight unless otherwise indicated.

Mold-release agents of the composition indicated below are used in the examples. The parts given are parts by weight.

Mold-release agent A
Salt of 3652 parts (approx. 1 mol) of

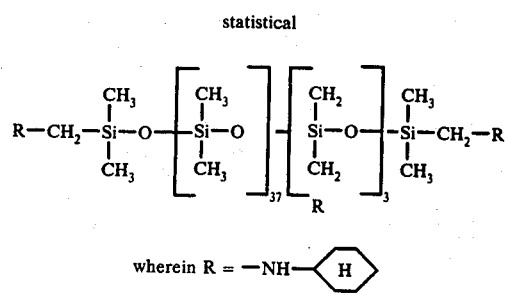

wherein R = —NH—⟨H⟩ and 1420 parts (approx. 5 mol) of oleic acid.
Mold-release agent B

Similar to A but with an equal quantity of tall-oil fatty acid mixture replacing the oleic acid.
Mold-release agent C
Salt of 800 parts (approx. 1 mol) of

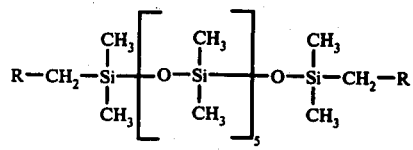

wherein R = —NH—⟨H⟩ and 850 parts (approx. 3 mol) of oleic acid.
Mold-release agent D
Salt of 1070 parts (approx. 1 mol) of

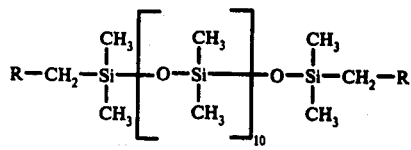

wherein R = —NH—⟨H⟩ and 850 parts (approx. 3 mol) of oleic acid.
Mold-release agent E
Similar to mold-release agent A but only 850 parts (approx. 3 mol) of oleic acid are used.
Mold-release agent F
Similar to mold-release agent D but the oleic acid is replaced by 1100 parts (approx. 2 mol) of a long chain fatty acid product having a molecular weight of approximately 600 which is prepared by esterifying 1 mole of recinoleic acid with 1 mol of oleic acid.
Mold-release agent G
Similar to mold-release agent D but the amino polysiloxane used for D is replaced by 2000 parts of a homologous amino polysiloxane which has about twice the molecular weight.
Mold-release agent H
Similar to D but R = —NH — CH₃.

EXAMPLE 1

100 parts by weight of a polyol mixture with an OH-number of 550 and a viscosity of 1650 cP at 25° C, consisting of:

60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylol-propane and propylene glycol (molar ratio 3:1);

1 part by weight of a commercial polysiloxane-polyalkylene oxide block polymer as a foam stabilizer;

12 parts by weight of a monofluorotrichloromethane as a blowing agent;

3 parts by weight of dimethyl benzylamine as a catalyst; 0.6 parts by weight of tetramethyl guanidine as a catalyst; 3 parts by weight of "internal mold-release agent" A; and 132 parts by weight of a polyisocyanate which has been prepared by phosgenating aniline-formaldehyde condensates, the viscosity of which has been adjusted to 120 cp at 25° C by distilling off diisocyanato-diphenylmethane isomers and which has an NCO-content of 31%.

The polyol mixture and blowing agent are mixed with the isocyanate mixture by means of a two-component feeding and mixing apparatus and introduced into a closed, tempered steel mold. The temperature of this mold is 60° C.

The mixture begins to foam after 16 seconds and sets after a further 13 seconds.

The molded part can be released from the steel mold after 5 minutes without sticking. When a series of 20 operations is carried out, slight sticking of the molded product to the mold occurs from the 10th product onwards and progressively increases to the 20th operation.

The hard molded product obtained has an overall gross density of 0.60 g/cm$^3$ and a thickness of 10 mm with a solid marginal zone on both sides.

EXAMPLE 2

100 parts by weight of a polyol mixture with an OH-number of 550 and a viscosity of 1650 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethyl benzylamine as a catalyst; 0.6 parts by weight of tetramethyl guanidine as a catalyst; 3 parts by weight of "internal mold-release agent" B; and 132 parts by weight of the polyisocyanate from Example 1.

The polyol mixture and blowing agent are mixed with the isocyanate mixture by means of a two-component feeding and mixing apparatus and introduced into a closed, tempered steel mold which is at a temperature of 60° C.

The mixture begins to foam after 18 seconds and sets after a further 14 seconds.

The molded part can be removed from the steel mold after 5 minutes. It adheres slightly to the surface of the mold. Seven molded products could be removed from the mold in succession.

The hard molded product obtained has an overall gross density of 0.60 g/cm$^3$ and a thickness of 10 mm with a solid marginal zone on both sides.

EXAMPLE 3

100 parts by weight of a polyol mixture with an OH-number of 550 and a viscosity of 1650 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethyl benzylamine as a catalyst;

0.6 parts by weight of tetramethyl guanidine as a catalyst;

3 parts by weight of "internal mold-release agent" C; and 132 parts by weight of the polyisocyanate from Example 1.

The polyol mixture and blowing agent are mixed with the isocyanate mixture by means of a two-component feeding and mixing apparatus and introduced into a closed, tempered steel mold which is at a temperature of 60° C.

The mixture begins to foam after 14 seconds and sets after a further 14 seconds.

The molded part can be removed from the steel mold after 5 minutes without sticking. In a series of 20 such operations, slight sticking occurred from the 16th operation onwards but did not increase.

The hard molded product obtained has an overall gross density of 0.60 g/cm$^3$ and a thickness of 10 mm with a solid marginal zone on both sides.

EXAMPLE 4

100 parts by weight of a polyol mixture with an OH-number of 550 and a viscosity of 1650 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethyl benzylamine as a catalyst;

0.6 parts by weight of tetramethyl guanidine as a catalyst;

3 parts by weight of "internal mold-release agent" D; and 132 parts by weight of the polyisocyanate from Example 1.

The polyol mixture and blowing agent are mixed with the isocyanate mixture by means of a two-component feeding and mixing apparatus and introduced into a closed tempered, steel mold which is at a temperature of 60° C.

The mixture begins to foam after 15 seconds and sets after a further 14 seconds.

The molded part can be removed from the steel mold after 5 minutes without any stickiness. It lies loosely on the surface of the mold. In a series of 20 such operations, no difference can be detected between the first and twentieth removal from the mold.

Analogous results are obtained when mold-release agent H is used instead of D.

The hard molded product obtained has an overall gross density of 0.60 g/cm³ and a thickness of 10 mm with a solid marginal zone on both sides.

EXAMPLE 5

100 parts by weight of a polyol mixture with an OH—number of 550 and a viscosity of 1650 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethyl benzylamine as a catalyst;

0.6 parts by weight of tetramethyl guanidine as a catalyst;

3 parts by weight of "internal mold-release agent" E; and 132 parts by weight of the polyisocyanate from Example 1.

The polyol mixture and blowing agent are mixed with the isocyanate mixture by means of a two-component feeding and mixing apparatus and introduced into a closed, tempered steel mold. The temperature of this mold is 60° C.

The mixture beings to foam after 15 seconds and sets after a further 13 seconds.

The molded part can be removed from the steel mold after 5 minutes without sticking to it. In a series of 20 such operations, sticking of the product to the mold begins at the 12th removal from the mold and increases progressively to the 20th removal from the mold.

The hard molded product obtained has an overall gross density of 0.60 g/cm³ and a thickness of 10 mm with a solid marginal zone on both sides.

EXAMPLE 6

100 parts by weight of a polyol mixture with an OH-number of 550 and a viscosity of 1560 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethylbenzylamine as a catalyst;

0.6 parts by weight of tetramethyl guanidine as a catalyst;

3 parts by weight of "internal mold-release agent" F; and 132 parts by weight of the polyisocyanate from Example 1.

The polyol mixture and blowing agent are mixed with the isocyanate mixture by means of a two-component feeding and mixing apparatus and introduced into a closed, tempered steel mold which is at a temperature of 60° C.

The mixture begins to foam after 16 seconds and sets after a further 15 seconds.

The molded part can be removed from the steel mold after 5 minutes without any stickiness. In a series of 20 such operations, the 20th removal from the mold is as good as the first.

The hard molded product obtained has an overall gross density of 0.60 g/cm³ and a thickness of 10 mm with a solid marginal zone on both sides.

EXAMPLE 7

100 parts by weight of a polyol mixture with an OH—number of 550 and a viscosity of 1650 cP at 25° C consisting of 60 parts by weight of a polyether with an OH-number of 830 which has been obtained by the addition of propylene oxide to trimethylolpropane and 40 parts by weight of a polyether with an OH-number of 42 which has been obtained by the addition of a mixture of propylene oxide and ethylene oxide to a mixture of trimethylolpropane and propylene glycol (molar ratio 3:1);

1 part by weight of a commercial polysiloxane-polyalkylene oxide block polymer as a foam stabilizer;

12 parts by weight of monofluorotrichloromethane as a blowing agent;

3 parts by weight of dimethyl benzylamine as a catalyst;

0.6 parts by weight of tetramethyl guanidine as a catalyst;

3 parts by weight of "internal mold-release agent" G; and 132 parts by weight of the polyisocyanate from Example 1.

The polyol mixture and blowing agent are mixed with the isocyanate mixture by means of a two-component feeding and mixing apparatus and introduced into a closed, tempered steel mold which is at a temperature of 60° C.

The mixture begins to foam after 15 seconds and sets after a further 13 seconds.

The molded part can be removed from the steel mold after 5 minutes without sticking to it. Slight stickiness sets in at the 8th operation and progresses to very severe stickiness by the time the 13th product is removed from the mold.

The hard molded product obtained has an overall gross density of 0.60 g/cm³ and a thickness of 10 mm with a solid marginal zone on both sides.

EXAMPLE 8

100 parts by weight of a polyol mixture with an OH-number of 260 and a viscosity of about 450 cP at 25° C consisting of:

91.1 parts by weight of a linear polyether with an average molecular weight of about 2000, an OH-number of 50 and a viscosity of 820 cP at 25° C which has been obtained by the addition of propylene oxide and ethylene oxide to propylene glycol and 22 parts by weight of butane diol;

0.8 parts by weight of 1,4-diaza-bicyclo-(2,2,2)-octane and 0.08 parts by weight of dibutyl tin dilaurate as catalysts;

4 parts by weight of monofluorotrichloromethane and 2 parts by weight of methylene chloride as blowing agent; and 6 parts by weight of "internal mold-release agent" C are reacted with 64 parts by weight of 4,4'-diphenylmethanediisocyanate which has been modified with uretdione groups and which has an NCO-content of 30% and a viscosity of 100 cP/25° C.

The polyol mixture is vigorously mixed with the isocyanate for 10 seconds by means of a mechanical stirrer and introduced into a steel plate mold which is at a temperature of 40° C.

The mixture begins to foam after 16 seconds and sets after a further 9 seconds. The molded part can be removed from the steel mold after 3 minutes and sticks only slightly to the surface of the mold. Seven molded parts produced successively in the mold without treating the mold surfaces can all be removed equally easily from the mold. The semirigid molded products obtained have an overall gross density of 0.75 g/cm³ and a thickness of 10 mm with solid marginal zones on both sides.

EXAMPLE 9

100 parts by weight of a polyol mixture with an OH—number of 260 and a viscosity of about 450 cP at 25° C consisting of:

91.1 parts by weight of a linear polyether with an average molecular weight of about 2000, an OH-number of 50 and a viscosity of 820 cP at 25° C which has been obtained by the addition of propylene oxide and ethylene oxide to propylene glycol and 22 parts by weight of butane diol;

0.8 parts by weight of 1,4-diaza-bicyclo-(2,2,2)-octane and 0.08 parts by weight of dibutyl tin dilaurate as catalysts, 4 parts by weight of monofluorotrichloromethane and 2 parts by weight of methylene chloride as blowing agents; and 6 parts by weight of "internal mold-release agent" D are reacted with 64 parts by weight of the modified polyisocyanate from Example 8.

The polyol mixture is vigorously mixed with the isocyanate for 10 seconds by means of a mechanical stirrer and introduced into a steel plate mold which is at a temperature of 40° C.

The mixture begins to foam after 16 seconds and sets after a further 9 seconds.

The molded part can be removed from the steel mold after 3 minutes. It sticks only slightly to the surface of the mold. Seven molded products produced in succession without treating the surfaces of the mold can all be removed equally easily from the mold. The semi-rigid molded products obtained have an overall gross density of 0.75 g/cm³ and a thickness of 10 mm with solid marginal zones on both sides.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for producing a foam plastic which readily separates from the mold in which it had been found wherein a foamable reaction mixture contains an organic polyisocyanate, an organic compound having a molecular weight of about 62 to about 10,000 which contain reactive hydrogen atoms, a catalyst for the isocyanate - reactive hydrogen reaction and a blowing agent; is charged to the mold and reacted, the improvement which comprises including in the reaction mixture salts of polysiloxanes which contain amino groups of the formula

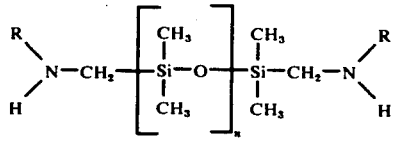

wherein $n$ is an integer from 4 to 20 and

R stands for aliphatic hydrocarbon radical having 1 to 4 carbon atoms or a cyclohexyl radical; and fatty acids with more than 7 carbon atoms to improve the mold release properties of the resulting molded product, 50 – 200 mol % of fatty acid being used per mol of amino groups.

2. Process according to claim 1, wherein the fatty acids used are oleic acid or commercial fatty acid mixtures which contain this acid.

3. Process according to claim 1, wherein the polysiloxanes with amino groups used are amino group-containing methyl polysiloxanes which have 5 to 80 Si-atoms.

* * * * *